United States Patent [19]

Baird, Sr.

[11] 3,795,100

[45] Mar. 5, 1974

[54] TIMING DEVICE

[76] Inventor: Curtis K. Baird, Sr., 313 Red Acre Rd., Stow, Mass. 01775

[22] Filed: Dec. 22, 1972

[21] Appl. No.: 317,613

[52] U.S. Cl.............. 58/145 R, 408/16, 58/145 A
[51] Int. Cl.............................................. G07c 1/00
[58] Field of Search .. 408/16; 58/77, 145 R, 145 A, 58/153 E; 73/488, 489

[56] References Cited
UNITED STATES PATENTS
2,783,836  3/1957  Kenline........................... 58/145 R Primary Examiner—Francis S. Husar
Attorney, Agent, or Firm—David E. Brook

[57] ABSTRACT

A timing device is disclosed which has particular application in determining the linear feed rate of a tool, e.g. a drill. An adjustable, linearly movable spindle attached to the feed rate indicator is positioned in contact with the tool or tool holder so that it will move at the same linear speed as the tool. Timing means, such as a stopwatch, are provided to measure the elapsed time that it takes the spindle to traverse a predetermined linear distance while it is in contact with the tool.

A unique arrangement of three slide members and two cams is used to start and stop the timing means at the beginning and end, respectively, of the predetermined linear distance. Two cam members, mounted in a vertically parallel relationship but having their activating faces offset in the vertical direction by said predetermined distance, are attached to the spindle. Two slide members mounted to slidably reciprocate in a vertical direction are attached to the cams so as to form an integral unit. As the integral unit is depressed, the cam faces engage a horizontal slide which activates and deactivates the stopwatch. Each of the slides and cams are spring biased so that they return to their original positions after operation.

7 Claims, 4 Drawing Figures

PATENTED MAR 5 1974    3,795,100

PATENTED MAR 5 1974 3,795,100

TIMING DEVICE

BACKGROUND OF THE INVENTION

1. Field of the Invention

This invention is in the field of feed rate indicators and more particularly is in the field of purely mechanical feed rate indicators which operate by accurately measuring the elapsed time it takes a tool to traverse a predetermined distance.

2. Description of the Prior Art

It has long been known that the efficiency of certain machine tool operations such as drilling, milling, reaming, etc. can be maximized if the linear feed rate of the tool is set and maintained at a specific value. Much work has been done in determining the correct rate of feed for various tools, particularly in such applications as the drilling of printed circuit boards. Correct feed rates not only produce more efficient drilling, but also extend the tool life.

As can be appreciated, it is impossible for operators of such equipment to accurately set the tool feed rate at the maximum value without the help of some type of feed rate indicator. In general, there have been at least three types of feed rate indicators developed to meet this need. These are the purely mechanical type, the electrical type, and the electro-mechanical hybrid types.

Heretofore, the purely mechanical type has not proven to be accurate enough for most applications, whereas the other types have proven to be too complicated and/or expensive for general acceptance. A need has arisen, therefore, for a simple, purely mechanical, inexpensive, yet highly accurate feed rate indicator.

SUMMARY OF AN EMBODIMENT OF THE INVENTION

In one embodiment, this invention relates to a purely mechanical timing device for accurately determining the linear feed rate of a tool such as a drill. The timing device described herein operates by registering the elapsed time it takes the tool to traverse a predetermined distance. Direct reading tables are then used to convert the elapsed time figures to actual linear feed rates, such as in inches per second, or alternatively, the indicator can be provided with a direct reading dial.

An adjustable, linearly movable spindle is brought into contact with the tool or tool holder so that the spindle moves at the same linear speed as the tool. Timing means, such as a stopwatch, are used to measure the elapsed time that it takes the spindle to move a predetermined linear distance.

The timing device of this invention has novel means to activate and deactivate the timing means as the spindle begins and finishes, respectively, its traverse of the predetermined distance. Two cams, whose actuating edges are offset vertically by the predetermined linear distance, are attached to the vertical spindle so that they move in the same direction as and with the same speed as the spindle. A first or activating cam engages a horizontally slidable member, which in turn activates the stopwatch. The second or deactivating cam operates in a similar manner to deactivate the stopwatch. Accurate alignment of the cams is provided by two vertical slides mounted around the cams and attached thereto, and these slides also reduce the drag on the cams thereby increasing the accuracy of the indicator.

The timing device as described herein has many advantages over those heretofore known. For example, the feed rate indicator described herein is compact and portable so that it can be carried to any machine in order to check the feed rate of a tool or slide thereon. Because the indicator doesn't have to be attached to the drill press etc., measurements can be taken very quickly with a minimum of setting up required. Additionally, the timing device has great flexibility since the predetermined distance between its cams can be varied thereby allowing the indicator to be operative over an extremely wide range of linear feed rates.

Another advantage is that this timing device does not have complicated electronics or optics such as limit switches, relays, motors, photocells, lenses, etc. Despite its simplicity, the timing device described herein is extremely accurate.

DESCRIPTION OF PREFERRED EMBODIMENTS

Figure 1:
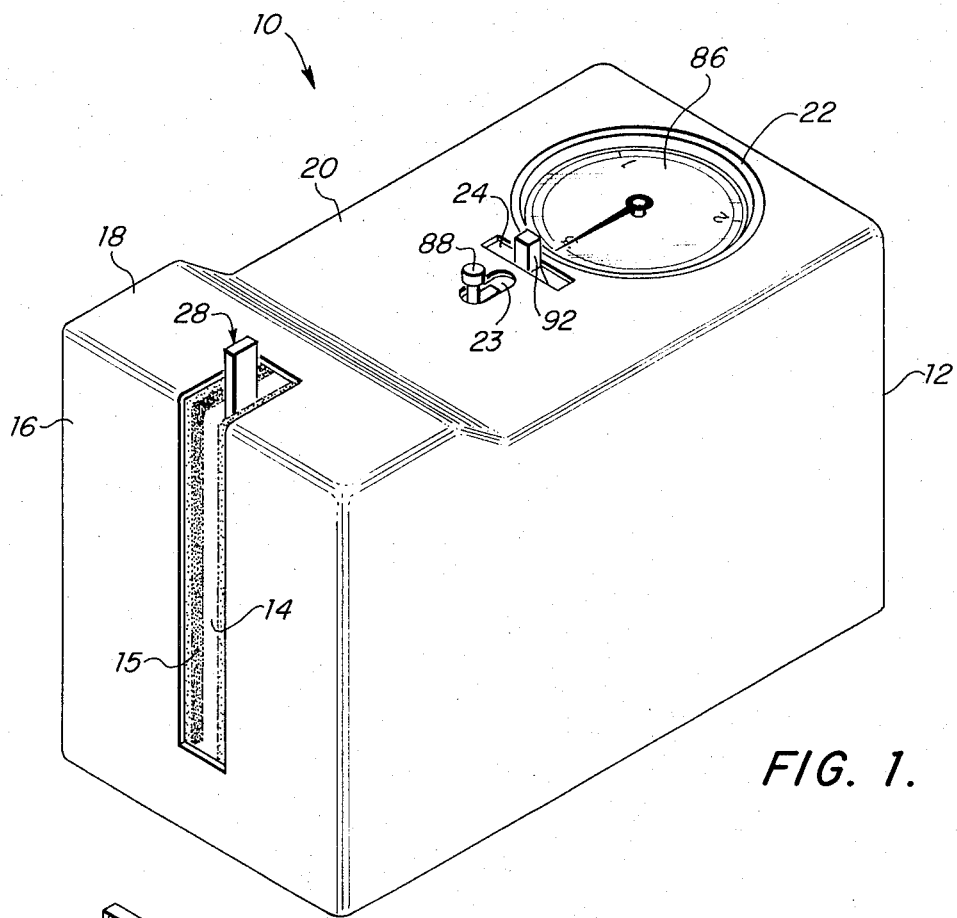
FIG. 1 illustrates a perspective view of a timing device as described herein when viewed with its outer housing in place.

Referring now in more detail to the Figures, a timing device 10 is shown in FIG. 1 as viewed in perspective when outer housing 12 is placed thereon. Housing 12 can be fabricated from any suitable material including plastics and metals, with sheet metal being particularly suitable. As can be seen, outer housing 12 has four openings therethrough. Rectangular opening 14 extends along the center of one end wall 16 and into a raised section 18 of the top of housing 12; opening 14 permits cam lever 28 to protrude therethrough, proving ready access thereto so that adjustable spindle 30 can be fastened to cam lever 28. Layer 15, which can be foamed plastic, acts as a wiper material and also helps to keep foreign substances from entering the indicator through opening 14.

Three additional openings are provided through the lower top section 20 of housing 12. Circular opening 22 provides a means of viewing stopwatch 86 from the exterior of timing device 10. As can be seen, most of stopwatch 86 is enclosed within housing 12 which provides a large measure of protection for it. The face of opening 22 can also be covered with a protective transparent plastic, such as a polycarbonate, or the crystal of watch 86 can be mounted directly in opening 22. Rectangularly shaped opening 24 provides access to the winding stem 84 on watch 86, such as by winding lever 92. Elliptical opening 28 is designed to allow reset lever 88 to pass through housing 12.

Thus, it can be appreciated that outer housing 12 provides protection to the delicate assemblage of elements in timing device 10, while allowing ready access from the exterior to any element required to operate the device. Optionally, outer housing 12 can be sealed to base 26, as for example by screwing or welding the lower portions of housing 12 to base 26. Base 26 can additionally have legs, such as two front legs 27 and one rear leg 29 as shown in FIG. 2.

Figure 4:
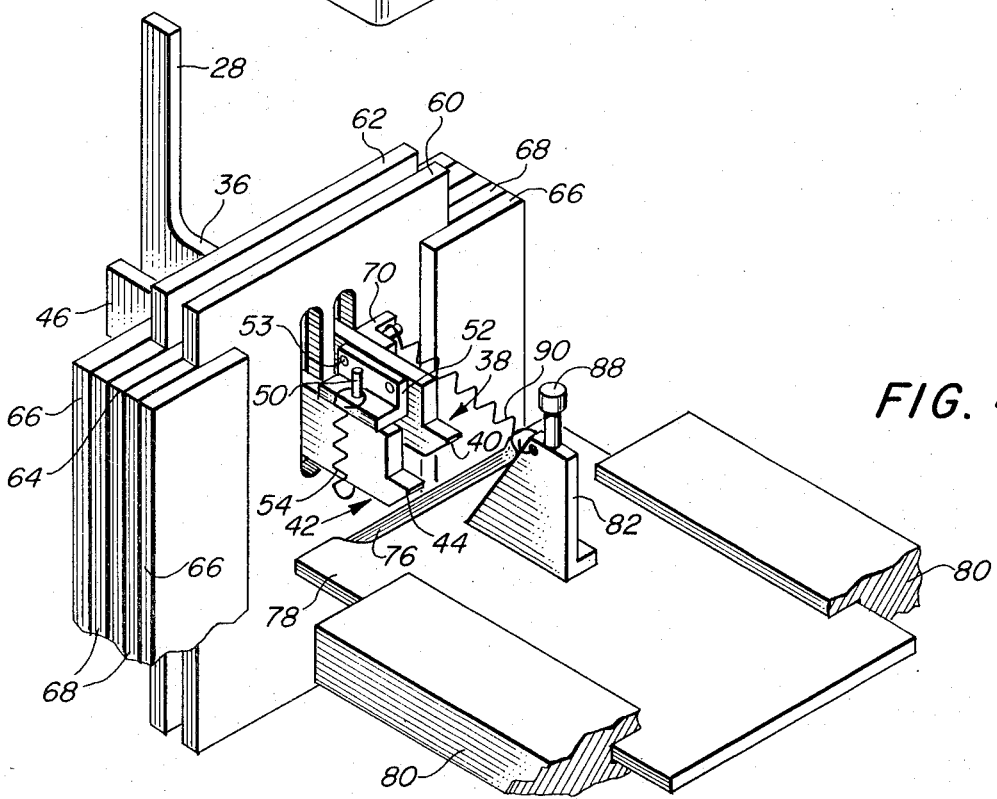
FIG. 4 illustrates a perspective view of the vertical and horizontal slide assemblies and the activating and deactivating cam mechanisms of a device as described herein.
Figure 3:
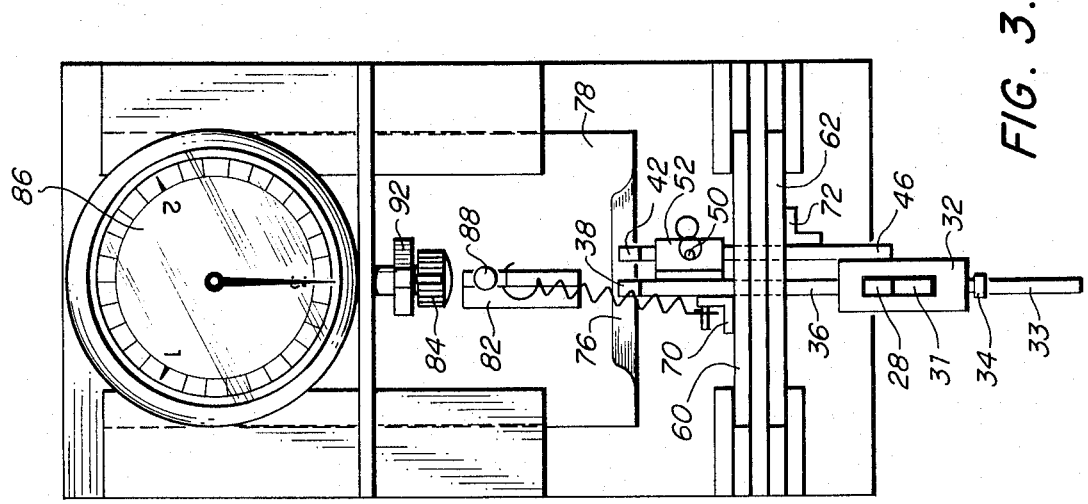
FIG. 3 is a plan view corresponding to FIG. 2.
Figure 2:
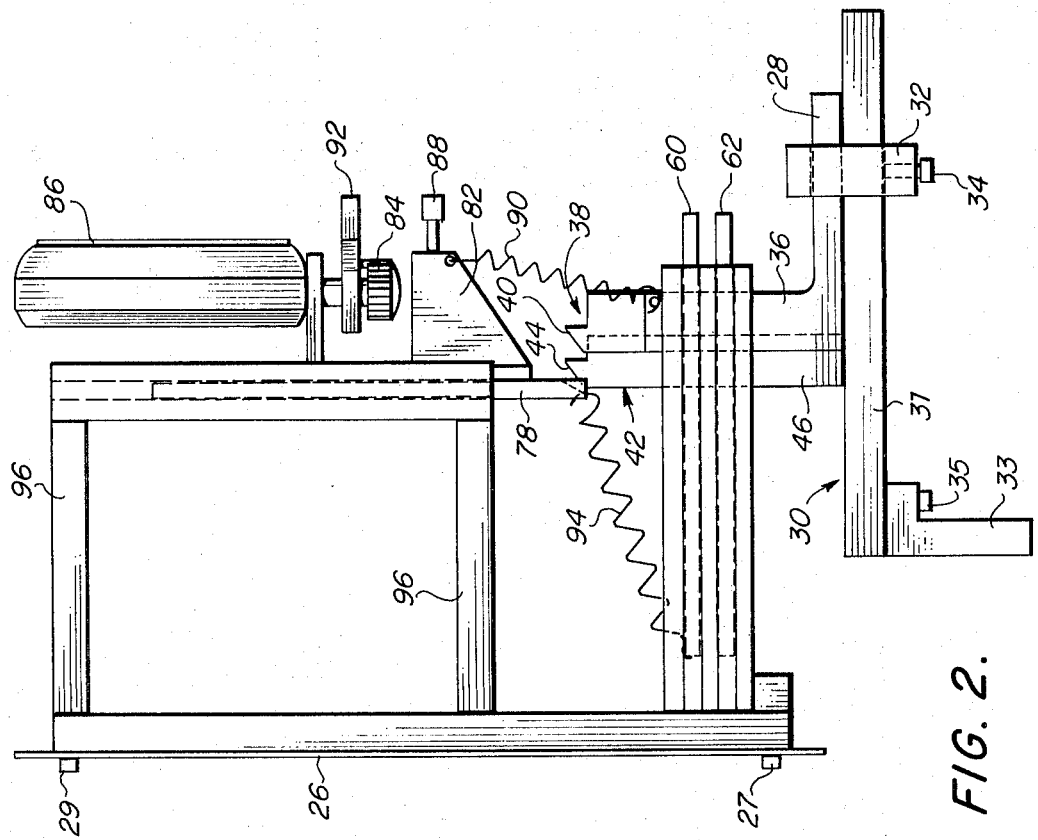
FIG. 2 illustrates a side elevation view of the internal components of a feed rate indicator as described herein.

The elements of feed rate indicator 10 enclosed within housing 12 can be seen more clearly in FIGS. 2, 3 and 4. Means to connect cam lever 28 to a moving tool, tool holder, slide, etc., are provided, such as L-shaped spindle 30 which is adjustably attached to cam lever 28 by collar 32 and set screw 34. As shown, L-shaped spindle 30 is formed from a straight, elongated vertical member 31 and a shorter, horizontal member at the bottom 33, which can be joined together by any suitable means such as screw 35.

Cam lever 28 has a horizontal portion 36 which terminates in cam member 38 having a notched portion with an angularly slanted cam face 40. A second cam 42 is positioned in a generally parallel but lower position than cam 38. Cam 42 also has a notched portion with an angularly slanted cam edge 44 which is similar in shape to cam 38. Cam 42 has an elongated straight body portion 46 which extends rearwardly in a parallel relationship to horizontal portion 36 of cam lever 28.

The vertical distance between the actuating edges of cams 38 and cam 42 can be set by adjusting set screw 50 which extends through L-shaped joining bracket 52 to set and maintain a predetermined distance therebetween. L-shaped bracket 52 is fastened by suitable means such as rivots 53 to cam 38, but is not fastened to cam 42, although it rests on the top of cam 42. Spring 54 retains cam 42 snuggly against the base of L-shaped bracket 52 also helping to maintain the desired predetermined distance.

As can be seen, the horizontal portions 36 and 46 of cams 38 and 42, respectively, pass through elongated elliptical openings cut through front vertical slide 60 and rear vertical slide 62. Slides 60 and 62 are mounted to reciprocably slide vertically against the faces of guide member 64 and these vertical slides are held in place by outer retaining members 66 and end retaining members 68.

In FIG. 3 it can be seen that cam 38 is attached to slide 60 by a fastening bracket 70 extending between the horizontal portion 36 and slide 60; in a similar manner, cam 42 is attached to slide 62 by fastening bracket 72. Thus, cams 38 and 42 and slides 60 and 62 move vertically as an integral unit. This unique assemblage minimizes drag caused by friction and also helps to eliminate any tipping in the movement of cams 38 and 42. Because of this, much closer tolerances can be used than would be possible if only one slide were used, which in turn provides the timing device described herein with a higher degree of accuracy.

As cams 38 and 42 move downwardly, their actuating edges engage a matching slanted edge 76 at the rear portion of horizontal slide 78 which is mounted in grooved support members 80 to slide horizontally. Slide 78 is similar in construction to slides 60 and 62, and it has a vertical member 82 thereon capable of striking the activating and deactivating stem 84 of stopwatch 86. As previously described, vertical member 82 has a reset arm 88 thereon which protrudes through opening 28 of outer housing 12 thereby allowing an operator to reset stopwatch 86 after each feed rate determination. Spring 90 retains slide 78 in its rearwardmost position when cams 38 and 42 are not engaged with slanted edge 76, and holds slide 78 tightly against the cams when they are engaged therewith.

Winding lever 92 passes through opening 24 whereby stopwatch 86 can be rewound as required.

Several features are illustrated only in FIG. 2. Spring 94, for example, is used to maintain slide 78 tightly against cams 38 and 42 as slides 60 and 62 are depressed due to movement of spindle 30 in a downward direction. Also, it can be seen that standoffs 96 are used to elevate the stopwatch 86 and horizontal slide 78 to the operating level of cams 38 and 42.

Many materials of construction are possible. One suitable material is ⅛ inch flat ground oil hardening die steel, although others such as stainless steel cast iron and cast steel also may be desirable.

Many modifications not described herein can be made within the scope of this invention. For example, although the description and drawings described above relate mainly to the determination of the feed rate of a tool or slide moving in a vertical direction, it can readily be seen by those skilled in the art that the device could be used either with or without modifications to measure the feed rate of a tool moving horizontally or in other directions. All such equivalent modifications are intended to be covered by the following claims.

What is claimed is:

1. A timing device for determining the linear feed rate of an object, comprising, in combination:
   a. a linearly movable spindle having means to contact said object whereby the spindle will move at the same linear velocity as the object;
   b. timing means for measuring the elapsed time it takes said spindle to move a predetermined linear distance; and,
   c. actuating means for starting said timing means as the spindle begins to traverse said predetermined distance and stopping said timing means when the spindle finishes traversing said predetermined distance, said actuating means including an activating cam and a deactivating cam, the cams having their actuating edges offset by said predetermined distance, both of said cams being mounted to move in the same linear direction as said spindle, and two parallel slides mounted to also move in the same linear direction as said spindle, the cams being joined to the slides to form an integral slidable unit.

2. A feed rate indicator of claim 1 wherein said spindle, said cams, and said parallel slides all are mounted to be movable in a vertical direction.

3. A feed rate indicator of claim 2 wherein said actuating means also includes a horizontal slide capable of sliding in a horizontal direction in response to said cams, said horizontal slide being capable of actuating or deactivating said timing means.

4. A feed rate indicator of claim 3 wherein said actuating cam is attached to the outer of said parallel vertical slides and said deactivating cam is attached to the inner of said parallel vertical slides.

5. A feed rate indicator of claim 4 wherein the predetermined distance between the actuating edges of said cams can be adjusted.

6. A feed rate indicator of claim 5 wherein said timing means comprises a stopwatch.

7. A feed rate indicator of claim 6 wherein said stopwatch comprises a three-second stopwatch.

* * * * *